United States Patent [19]

Anders

[11] Patent Number: 4,573,799
[45] Date of Patent: Mar. 4, 1986

[54] DEGASSING EXTRUSION DEVICE

[75] Inventor: Dietmar Anders, Hanover, Fed. Rep. of Germany

[73] Assignee: Hermann Berstorff Maschinenbau GmbH, Hannover, Fed. Rep. of Germany

[21] Appl. No.: 525,710

[22] Filed: Aug. 23, 1983

[30] Foreign Application Priority Data

Aug. 26, 1982 [EP] ................................................ 82107840

[51] Int. Cl.⁴ ........................ B30B 11/22; B30B 11/24
[52] U.S. Cl. ..................................... 366/89; 366/323; 425/203
[58] Field of Search .................... 425/203, 73, 97, 190, 425/131.1, 576; 366/79, 89, 323; 264/349

[56] References Cited

U.S. PATENT DOCUMENTS

| | | | |
|---|---|---|---|
| 3,525,124 | 8/1970 | Ocker | 425/204 |
| 3,664,795 | 7/1969 | Heinz et al. | 425/208 |
| 3,868,093 | 2/1975 | Sokolow | 366/89 |
| 4,178,104 | 12/1979 | Menges et al. | 366/80 |
| 4,185,060 | 1/1980 | Ladney, Jr. | 425/203 |
| 4,287,157 | 9/1981 | Koch | 422/205 |
| 4,423,960 | 1/1984 | Anders | 366/75 |

Primary Examiner—Jay H. Woo
Assistant Examiner—Timothy W. Heitbrink
Attorney, Agent, or Firm—Schwartz, Jeffery, Schwaab, Mack, Blumenthal & Evans

[57] ABSTRACT

A screw- or worm-type degassing extrusion device wherein a pin region is provided to increase throughput of the mixture to be extruded, such increased throughput being maintained and utilized to provide an adequate pressure for, for example, a tool by locating the pin region immediately upstream of the degassing region and by increasing the diameter of the cylinder or barrel of the extrusion device in the degassing and discharge regions compared with its diameter in the pin region.

5 Claims, 1 Drawing Figure

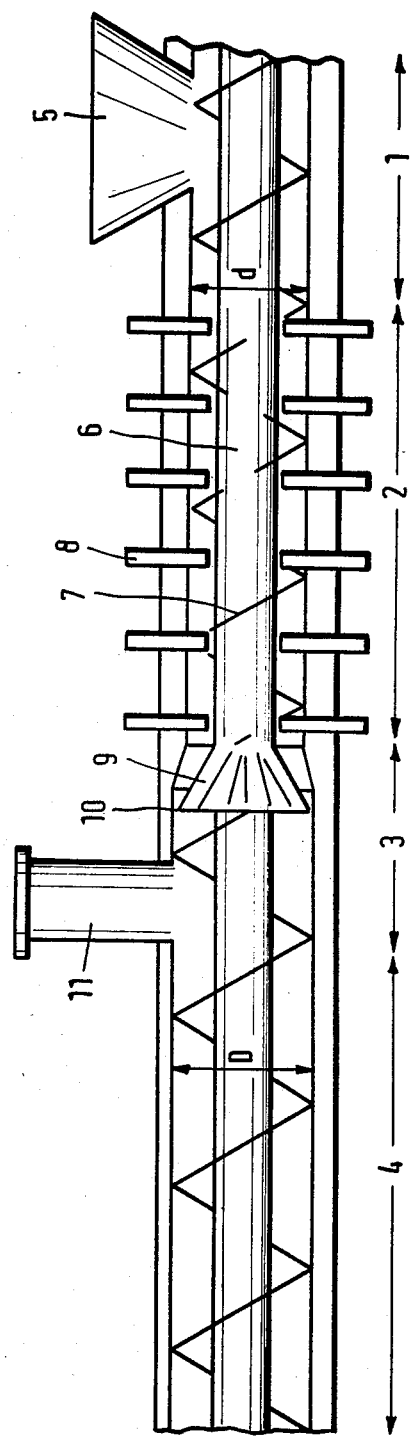

DEGASSING EXTRUSION DEVICE

BACKGROUND OF THE INVENTION

The present invention relates to a degassing extrusion device which is suitable for extruding thermoplastic materials and rubber. More particularly, the invention relates to an extrusion device of the type which includes a material feed region, a pin region, a degassing region and a material discharge region.

DESCRIPTION OF THE PRIOR ART

In U.S. Pat. No. 4,178,104, there is disclosed a pin-cylinder (or pin-barrel) extrusion device in which pins extend through the cylinder or barrel surrounding a worm conveyor. The conveyor flights are radially interrupted in the regions where the pins extend into the chamber of the barrel or cylinder.

Such pin-barrel extruders operate satisfactorily in practice because they permit the optimal mixing and homogenization of temperature-sensitive rubbers and thermoplastic materials. The materials are not subjected to excessive shearing forces if the mixing and homogenization operations are carried out utilising such an arrangement. Excessive shearing forces would, of course, cause the temperature of the material to be increased detrimentally.

However, the main advantage of pin-barrel extrusion devices is that the pins which extend into the chamber of the barrel prevent the material from rotating with the worm, which causes the throughput of the device to be increased considerably.

Such increased throughput is highly desirable in conventional extrusion devices. If, however, the material also needs to be degassed, it must be subjected to a drop in pressure in a degassing region. This is necessary to release gases which have been produced during the heating of the material and to enable such gases to be extracted through a degassing aperture. The degassing region must be kept substantially pressureless, that is to say, it may only be partially filled with material, because the degassing aperture will, otherwise, become blocked by the material which has been plasticized.

Accordingly, a substantial disadvantage becomes apparent. The use of the pin-barrel provides the above-mentioned considerable advantages and results in the throughput being considerably increased, but such increased throughput gives rise to grave problems in the degassing region.

An additional problem arises in the fact that the discharge region of the device must be able to cope satisfactorily with the increased throughput from the pin-barrel region.

The application of conventional worm geometry theory in the discharge region is insufficient to accommodate the increased throughput and to convey such throughput against the resistance of a filter and an extrusion tool or die, without causing the material to return to, and cause blockages in, the degassing region. A solution for coping with low tool resistances would be to provide a very long discharge region having a large thread depth or clearance. However, this measure makes the price of the device excessively high and is not an economically viable solution.

OBJECTS OF THE INVENTION

The present invention seeks to provide a degassing extrusion device in which a pin-barrel and a degassing region are provided, but in which the increased throughput achieved by the pin-barrel region is accommodated by the degassing and discharge regions. This is achieved by ensuring that the degassing region is only partially filled, despite the considerably increased throughput, by ensuring that the throughput can be conveyed against the resistance of extrusion tools which are often provided at the downstream end of the discharge region.

SUMMARY OF THE INVENTION

According to the present invention, there is provided a degassing extrusion device suitable for extruding thermoplastic materials and rubber comprising a hollow cylinder, or barrel screw or worm means extending axially within said hollow cylinder, said interior of said hollow cylinder defining a plurality of treatment regions, said treatment regions comprising a feed region for receiving material to be treated, a pin region downstream of and in communication with said feed region, a degassing region downstream of and in communication with said pin region and a discharge region downstream of and in communication with said degassing region, wherein said degassing region is immediately downstream of said pin region and said hollow cylinder has a first diameter in said degassing and discharge regions and a second diameter in said pin region, said first diameter exceeding said second diameter.

The diameter of the extrusion barrel or cylinder in the degassing and discharge regions is desirably 10 to 30% greater than the diameter of the barrel or cylinder in the pin region. Advantageously, the diameter in the degassing and discharge regions is 15 to 25% greater than the diameter in the pin region, the optimum being 20% greater. By providing the degassing and discharge regions immediately downstream of the pin region the increased throughput produced by the pin-barrel region can be degassed immediately in the same extrusion device.

Optimal degassing is achieved because the material is unstressed after it has flowed past the enlargement or blister, which causes considerable drop in pressure to occur. The enlargement or blister is disposed immediately upstream of the degassing aperture.

A large amount of free space is produced by increasing the diameter of the barrel in the degassing and discharge regions compared with the pin region. Such free space is a pre-requisite for increasing the exposed surface area of the material and for ensuring that such material to be degassed is in thin layers. This is because gas bubbles can escape more readily from the mixture.

However, the major advantage of increasing the diameter of the barrel is that it permits the throughput of the discharge region to be increased considerably. Such an increased throughput means that, on the one hand, the increased throughput of the pin-barrel region can be accommodated and, on the other hand, sufficient material is always conveyed rapidly from the degassing region so that such degassing region is never completely filled with material.

As previously mentioned, the complete filling of the threads of the worm in the degassing region would cause the cessation of the degassing of the material and would cause the degassing aperture to become blocked. A time-consuming cleaning operation would then be necessary before further degassing could be effected. The provision of an arrangement in accordance with the present invention permits the throughput of the discharge region of a degassing extrusion device to be increased so as to take advantage of the extremely advantageous increased output produced by the pin-barrel region.

It is also particularly advantageous that the discharge region can be made comparatively short compared with known extrusion devices and this makes the device in accordance with the present invention cheaper to produce.

Moreover, from a technological point of view, the short overall length provides the great advantage that the material being treated has a short dwell time in the extrusion device and is therefore subject to less thermal stress than in known arrangements.

BRIEF DESCRIPTION OF THE DRAWINGS

One embodiment of a degassing extrusion device in accordance with the present invention will be further described, by way of example, with reference to the accompanying drawing, the single FIGURE of which shows a schematic sectional illustration of such a device.

DESCRIPTION OF PREFERRED EMBODIMENT

In the FIGURE, there is shown a degassing extrusion device which comprises four main regions. These regions are a material feed region 1, a pin region 2, a degassing region 3, and a material discharge region 4. The four regions 1, 2, 3 and 4 are in communication with one another and are traversed successively by the material being treated.

The feed region 1 is provided with a material feed device in the form of a hopper 5 by means of which the material passes into the interior of the cylinder of the extrusion device.

In the embodiment shown, a worm 6 is provided within the cylinder, the worm 6 having a continuous core which is uniform in diameter along the entire length thereof throughout the sections 1, 2, 3 and 4. Helical conveyor flights 7 are provided on the core.

In the pin region 2 are radially extending pins 8, which are provided at regular intervals around the circumference of the worm 6. These pins project into the cylinder or barrel chamber and, in combination with one another, form pin planes. The conveyor flights 7 are radially trimmed or milled in the regions where the pins 8 protrude into the cylinder or barrel chamber.

Separating the pin region 2 from the degassing region 3 is an enlargement portion or blister 9 formed around the core of the worm, an annular gap 10 being defined around the portion 9 to permit the material being treated to pass from the pin region 2 into the degassing region 3. In the degassing region 3, a degassing aperture 11 is provided which is connected to a vacuum device or other pressure-reduction device. Operation of this causes the removal of gaseous components from the molten or fused material.

The diameter "D" of the cylinder or barrel in the degassing and discharge regions 3 and 4 is respectively of the order of 20% greater than the diameter "d" of the cylinder or barrel in the pin region. Because of the fact that the core diameter of the worm 6 remains constant a considerably greater volume of material can be treated and the throughput of the device is increased. The arrangement of the present invention therefore makes it possible to utilise, effectively and economically, a pin region and a degassing region in the same extrusion device.

A commercial embodiment of degassing extrusion device which produces excellent results has the following characteristics:

1. A diameter "d" of 200 mm for the cylinder or barrel in the feed and pin regions;
2. A diameter "D" of 250 mm for the cylinder or barrel in the degassing and discharge regions;
3. A worm length in the feed region corresponding to three times the diameter of the worm;
4. A worm length in the pin region corresponding to 7.5 times the diameter of the worm;
5. A worm length in the degassing region corresponding to twice the diameter of the worm; and
6. A worm length in the discharge region corresponding to four times the diameter of the worm.

Such an arrangement provided an output of 1,800 kg/h at 20 revolutions per minute and built up a counterpressure of 150 bars (tool pressure) in the discharge region.

It has only been possible, hitherto, to build up a tool pressure of between 20 and, at most, 50 bars in a degassing extrusion device in which the cylinder or barrel has a uniform diameter of 200 mm throughout its entire length without causing the material to form a blockage in the degassing region. Such a blockage does, of course, make it impossible to effect any further degassing until the blockage is removed.

Degassing extrusion devices generally need to build up a pressure for a tool, such as a profile head for the extrusion of a rubber web, since such a tool is often located at the downstream end of the device. When utilising a degassing extrusion device having a uniform cylinder barrel diameter of 200 mm, it was necessary to reduce the discharge output to between 1,000 and 1,200 kg/h to attain a tool pressure of only 100 bars. This result could not be significantly improved, even by extending the discharge region to economically unrealistic length or by optimizing the worm geometry.

The advantageous increase in the output produced in the pin region of a pin and cylinder extruder can, it would appear, only be fully utilised if the material is subsequently to be degassed in the extruder by utilising an arrangement in accordance with the present invention.

I claim:

1. A degassing extrusion device suitable for extruding thermoplastic materials and rubber comprising a hollow cylinder, worm means extending axially within said hollow cylinder, said interior of said hollow cylinder defining a plurality of treatment regions, said treatment regions comprising a feed region for receiving material to be treated, a pin region downstream of and in communication with said feed region and having pins located therein which extend radially into the space between said cylinder and said worm so as to increase the pressure in said pin region, a degassing region downstream of an in communication with said pin region and a discharge region downstream of and in communication with said degassing region, wherein said degassing region is immediately downstream of said pin region and said hollow cylinder has a first diameter in said degassing and discharge regions and a second diameter in said pin region, said first diameter exceeding said second diameter.

2. A degassing extrusion device as recited in claim 1, in which said first diameter exceeds said second diameter by 10 to 30%.

3. A degassing extrusion device as recited in claim 2 wherein said first diameter exceeds said second diameter by 15 to 25%.

4. A degassing extrusion device as recited in claim 2 wherein said first diameter exceeds said second diameter by about 20%.

5. A degassing extrusion device as recited in claim 1 wherein said communication between said pin region and said degassing region occurs around a periphery of an enlargement means, said enlargement means defining an external periphery and being mounted on said worm, said external periphery and the interior surface of said hollow cylinder defining an annular flow channel for said material to be extruded between said pin region and said degassing region.

* * * * *